United States Patent [19]

Mathieu

[11] 4,259,121
[45] Mar. 31, 1981

[54] METHOD OF PREPARING A NOVEL CEMENT PARTICULARLY SUITABLE AS A REFRACTORY CEMENT

[75] Inventor: Alain Mathieu, Montelimar, France

[73] Assignee: Lafarge Fondu International, Neuilly-sur-Seine, France

[21] Appl. No.: 109,481

[22] Filed: Jan. 4, 1980

[30] Foreign Application Priority Data

Jan. 5, 1979 [FR] France .................. 79 00213

[51] Int. Cl.³ .................................. C04B 7/32
[52] U.S. Cl. ...................................... 106/104
[58] Field of Search ........................ 106/104

[56] References Cited

U.S. PATENT DOCUMENTS

| | | | |
|---|---|---|---|
| 3,510,326 | 5/1970 | Miki | 106/104 |
| 3,857,714 | 12/1974 | Mehta | 106/104 |

*Primary Examiner*—James Poer
*Attorney, Agent, or Firm*—Burgess, Ryan and Wayne

[57] ABSTRACT

A refractory cement with outstanding mechanical properties contains 10 to 30 parts by weight of $C_4A_3\bar{S}$ clinker and 70 to 90 parts by weight of an aluminous clinker including 30 to 75% CA. This cement may be prepared by either grinding said clinkers to a specified fineness and then mixing the same, or by grinding said clinkers simultaneously and jointly to said specified fineness. The novel double clinker cement allows concrete with considerably improved refractory and mechanical properties to be prepared, as compared to the corresponding products known up to now.

7 Claims, No Drawings

METHOD OF PREPARING A NOVEL CEMENT PARTICULARLY SUITABLE AS A REFRACTORY CEMENT

The present invention relates to a process for preparing a novel cement particularly suitable as a refractory cement. It is also related to the cement obtained by such process, as well as the clinkers used when carrying out the same.

The cement according to the invention is a double clinker cement containing anhydrous calcium sulphonate (designated herein-below by the abridged formula $C_4A_3\bar{S}$) and a conventional aluminous clinker.

The novel cement enables refractory concretes to be made with improved mechanical properties and, possibly, improved refractory properties as compared to conventional aluminous cements.

The $C_4A_3\bar{S}$ cement, the formula of which written in full is $4CaO,3Al_2O_3,SO_3$, is a product well-known per se; it constitutes essentially the expanding complex added to Portland cement either by mixing or by adding calcium sulphate to the Portland cement raw materials, with a view to obtaining so-called "shrinkage compensating cements".

According to a known method, an aluminous clinker containing $C_4A_3\bar{S}$ can be made by adding calcium sulphate to aluminous cement, raw materials and by sintering said mixture, enlarging or broadening the sintering range.

When a double clinker cement according to the invention is to be prepared, a $C_4A_3\bar{S}$ clinker and an aluminous clinker are mixed in a ratio comprised between 10/90 and 30/70.

Preferably the aluminous clinker contains 30 to 70% CA(CaO, $Al_2O_3$). Such clinkers are used for making cements of the type sold under the commercial designation "Fondu" or "Secar" by the Lafarge Fondu International Company.

Depending on the particular case envisaged, the clinkers are either mixed then ground together to about 4000 cm$^2$/g Blaine specific surface, or are ground separately to the required granulometric particle size prior to mixing the thus ground clinkers. In this latter case the granulometric data (the particle size) of the constituents should be comprised between 2600 cm$^2$/g Blaine S.S. and 5000 cm$^2$/g (preferalby 3000 cm$^2$/g S.S) for the aluminous clinker, and between about 5000 and 8000 cm$^2$/g Blaine S.S. (preferably 7000 cm$^2$/g Blaine S.S.) for the $C_4A_3\bar{S}$ clinker.

The chemical composition of the $C_4A_3\bar{S}$ clinker is as follows (in % by weight):

| . CaO | = | 35–37 |
|---|---|---|
| . $Al_2O_3$ | = | 48–54 |
| . $SO_3$ | = | 9–14 |
| . $Fe_2O_3$ | = | 0–4 |
| . $SiO_2$ | = | 0–4. |

As a matter of fact the raw materials used are substances proper to provide the required CaO, $Al_2O_3$ and $SO_3$. Preferably the following substances are used:

substances providing CaO: limestone, burnt lime, slaked lime;
substances providing $Al_2O_3$: alumina, hydrated alumina, white bauxite, red bauxite;
substances providing $SO_3$: gypsum, plaster, calcium sulphate, semi-hydrate, anhydride and aluminium sulphate.

The raw materials are mixed and ground until 95% of the particles have a size of less than 100 $\mu$m, and are then burnt until the sintering stage is reached. Preferably the sintering temperature of $C_4A_3\bar{S}$ is equal to or higher than 1400° C.; an advantageous sintering temperature is equal to about 1500° C.

As will be explained herein-below, by mixing clinkers of the kind defined herein-above, cements having particularly advantageous mechanical properties can be obtained.

According to one embodiment of the invention a $C_4A_3\bar{S}$ clinker was prepared by the instant method using the following raw materials:

| . $CaCO_3$ | = 38.51% |
|---|---|
| . $CaSO_4 \cdot 2H_2O$ | = 23.13% |
| . Alumina ground to 6000 cm$^2$/g Blaine S.S. | = 39.36% |

The mixture of these constituents was ground until its granulometry was such that 95% of the particles forming the mixture had a size of less than 100 $\mu$m; the mixture was then moulded into bricks with 25 to 30% water in the presence of 2.5% of a lignosulphonate. The bricks thus obtained were progressively heated to a temperature of 160° in an oven, and then maintained during 90 minutes at various sintering temperatures.

Appended Table I lists the chemical and mineralogical properties of the resulting $C_4A_3\bar{S}$ as a function of the soak temperature.

Table I shows that the range of $C_4A_3\bar{S}$ soak temperatures within which no volatization of $SO_3$ occurs is very broad.

The phases other than $C_4A_3\bar{S}$ disappear when the temperature exceeds 1400° C.; at a sintering temperature higher than 1500° C. the sulphate will volatilize.

The invention is not limited to the process described herein-before; the $C_4A_3\bar{S}$ clinker may be prepared by a dry or semi-dry process in accordance with the methods well known in the cement making industry.

The invention will be described in a more detailed manner herein-below with reference to several examples which are given by way of illustration, but which are not limiting. When not otherwise specified, the proportions are indicated in percentages by weight.

TABLE I

| Soak temperature °C. | Average chemical composition of the $C_4A_3\bar{S}$ clinkers | | | | X-ray diffraction Intensities[1] | | | |
|---|---|---|---|---|---|---|---|---|
| | CaO | $Al_2O_3$ | $SO_3$ | Impurities | $C_4A_3\bar{S}$ | CA | $CaSO_4$ | $C_{12}A_7$ |
| 1350 | 37.15 | 49.90 | 12.80 | 0.15 | F | m | mf | |
| 1370 | " | " | " | " | TF | f | — | |
| 1400 | " | " | " | " | TF | f | — | |
| 1430 | " | " | " | " | TF | — | — | |
| 1500 | " | " | " | " | TF | — | — | |
| 1550 | 42.60 | 57.20 | — | | | F | | F |

[1]TF = very strong  F = strong  m = medium  mf = medium to low  f = low

EXAMPLES 1 to 5

A double clinker cement was prepared according to the present invention by mixing a $C_4A_3\bar{S}$ clinker as defined herein-above, ground to a fineness of 7000 cm²/g Blaine S.S. with an aluminous clinker containing 40% CA (Fondu clinker) ground to a 3000 cm²/g Blaine S.S.

The final chemical composition of this double clinker cement was as follows:

| Cement | Fondu/C₄A₃S̄ mixture: | SiO₂ | Al₂O₃ | CaO | Iron oxides | TiO₂ | SO₃ | Impurities |
|---|---|---|---|---|---|---|---|---|
| a | 85 | 15 | 3.23 | 40.39 | 38.38 | 13.90 | 1.74 | 1.92 | 0.44 |
| b | 80 | 20 | 3.04 | 40.94 | 38.31 | 13.08 | 1.64 | 2.56 | 0.43 |
| c | 75 | 25 | 2.85 | 41.51 | 38.24 | 12.26 | 1.54 | 3.25 | 0.35 |

Table II appended hereto indicates the properties of concretes prepared on the basis of the double clinker cement (Fondu - C₄A₃S̄) and shows:

the W/C ratio (water/cement ratio by weight) as determined by the so-called "ball-in-the-hand" method)

the modulus of rupture (F) and compressive strength (C) after heating the concretes to about 800° C. in conformity with ASTM standard C 268, for various C₄A₃S̄ sintering temperatures and various Fondu-C₄A₃S̄ ratios of the cement composition.

The concretes examined were concretes with calcined fire-clay (chamotte) aggregates containing 42 to 44% Al₂O₃ having a particle size of 0 to 5 mm according to the Fuller curve, the cement content was 500 kg per m³ concrete, and the indicated properties are compared to those of concretes prepared from Fondu only.

Appended Table II shows that the properties of the concrete were strongly influenced by the quality of the C₄A₃S̄.

It can be seen that the improvement of the mechanical strength after heating was obtained when the C₄A₃S̄ was soaked at a temperature of more than 1400° C., more particularly at 1500° C.

The Table shows that the W/C ratio decreased while the consistency (determined by the ASTM "ball" method) remained constant; it should be noted that this ratio decreased as the C₄A₃S̄ sintering temperature increased.

TABLE II

| Examples | Soak temperature for the C₄A₃S̄ preparation | Composition of the cement, % Fondu | C₄A₃S̄ | W/C | Mechanical properties of the concrete after heating to 800° C. MPa F¹ | C² |
|---|---|---|---|---|---|---|
| | | 100 | 0 | 0.42 | 4.3 | 40.0 |
| 1 | 1350° C. | 85 | 15 | 0.40 | 4.3 | 42.0 |
| | | 80 | 20 | 0.41 | 4.5 | 37.5 |
| | | 75 | 25 | 0.41 | 3.8 | 43.5 |
| 2 | 1370° C. | 85 | 15 | 0.44 | 4.3 | 42.0 |
| | | 80 | 20 | 0.45 | 4.2 | 44.0 |
| | | 75 | 25 | 0.45 | 3.8 | 43.5 |
| 3 | 1400° C. | 85 | 15 | 0.39 | 5.4 | 51.5 |

TABLE II-continued

| Examples | Soak temperature for the C₄A₃S̄ preparation | Composition of the cement, % Fondu | C₄A₃S̄ | W/C | Mechanical properties of the concrete after heating to 800° C. MPa F¹ | C² |
|---|---|---|---|---|---|---|
| | | 80 | 20 | 0.39 | 5.6 | 57.5 |
| | | 75 | 25 | 0.39 | 5.8 | 55.0 |
| 4 | 1430° C. | 85 | 15 | 0.39 | 6.1 | 55.5 |
| | | 80 | 20 | 0.39 | 6.3 | 56.0 |
| | | 75 | 25 | 0.39 | 6.7 | 58.5 |
| 5 | 1500° C. | 80 | 20 | 0.37 | 6.9 | 62.0 |
| | | 75 | 25 | 0.37 | 7.1 | 65.0 |

¹F = modulus of rupture
²C = Compression

TABLE III

Refractories under load:

| | Temperature for movement under load of indicated % age | | | | | Modulus of rupture at 1000° C. |
|---|---|---|---|---|---|---|
| | 0.5% | 1% | 2% | 5% | 10% | MPa |
| Fondu | 1195° C. | 1250 | 1350 | 1360 | 1390 | 3.3 |
| Fondu 80% C₄A₃S̄-20% | 1185 | 1230 | 1300 | 1355 | 1400 | 6.0 |

TABLE IV chamotte concrete 42–44% Al₂O₃ (0–5 mm)
Cement content 500 kg/m³

| Examples | | W/C | Cured at 20° C. MPa 24 h F | C | After heating MPa 110° C. F | C | 800° C. F | C | 1100° C. F | C |
|---|---|---|---|---|---|---|---|---|---|---|
| | FR® 100% | 0.39 | 12.8 | 115.0 | 8.1 | 103.0 | 4.4 | 60.0 | 5.1 | 36.0 |
| 6 | FR 80% + C₄A₃S̄ 20%¹ | 0.39 | 13.8 | 100.5 | 10.3 | 100.0 | 6.5 | 61.5 | 5.1 | 35.0 |
| 7 | FR 80% + C₄A₃S̄ 20%² | 0.38 | 11.1 | 105.0 | 11.6 | 101.5 | 7.3 | 72.5 | 5.8 | 37.0 |

¹C₄A₃S̄ soaked at 1430° C.
²C₄A₃S̄ soaked at 1500° C.
FR = Fondu R

In appended Table III the properties of the chamotted concretes similar to those descried herein-above and obtained, respectively by using Fondu and a double clinker according to the invention, said double clinker containing 80% Fondu and 20% C₄A₃S̄ sintered at 1500° C.

It can be seen that the modulus of rupture of the double clinker cement (Fondu+C₄A₃S̄) as measured at 1000° C., was improved, compared to Fondu alone. Furthermore, the addition of C₄A₃S̄ to the Fondu (40% CA) had no deleterious effect on the refractory properties as tested by measuring the amount of movement under a load of 0.2 MPa in accordance with French standard B 49 105.

EXAMPLES 6 AND 7

Double clinker cement prepared by mixing:

Fondu, 95% of the particles of which have a size lower than 40 μm (Fondu R); its Blaine specific surface being 4950 cm$^2$/g;

$C_4A_3\bar{S}$ sintered at 1430° C. to 1500° C. and ground to a fineness of 7000 cm$^2$/g Blaine S.S.

Appended Table IV illustrates the influence of the $C_4A_3\bar{S}$ clinker on the mechanical properties of the concretes prepared from double clinker cements:

after curing for 24 hours at 20° C., after heating the concrete to temperatures of 110°–800°–1100° C.

This Table shows that adding $C_4A_3\bar{S}$ soaked at 1500° C. resulted in an improvement of the properties after heating compared to Fondu R alone, particularly after heating the same to a temperature of 800° C.

EXAMPLES 8 TO 10 p Double clinker cement prepared from $C_4A_3\bar{S}$ and Secar (about 70% CA). According to another embodiment of the invention the double clinker cement contained:

a $C_4A_3\bar{S}$ soaked at 1500° C. and ground to 7000 cm$^2$/g Blaine S.S.

a white aluminous cement clinker (Secar) ground to 3600 cm$^2$/g Blaine S.S.

The average composition (in % by weight) of the Secar used was as follows:

| | | |
|---|---|---|
| . Al$_2$O$_3$ | = | 70.85 |
| . CaO | = | 28.60 |
| . SiO$_2$ | = | 0.10 |
| . Na$_2$O | = | 0.45 |

The results yielded by the chamotte concrete (42–44% Al$_2$O$_3$ 0–5 mm Fuller grinding) are listed in the appended Table V, for a 500 kg/m$^3$ cement content and various $C_4A_3\bar{S}$ proportions.

TABLE V

| | | | | chamotte concrete 42–44% Al$_2$O$_3$ Mechanical properties after heating, MPa | | | |
|---|---|---|---|---|---|---|---|
| | | | | 800° C. | | 1100° C. | |
| Examples | SECAR | $C_4A_3\bar{S}$ | W/C | F | C | F | C |
| | 100% | 0% | 0.42 | 4.2 | 71.5 | 4.2 | 50.5 |
| 8 | 95% | 5% | 0.39 | 7.4 | 78.5 | 5.8 | 47.5 |
| 9 | 90% | 10% | 0.39 | 8.6 | 93.0 | 6.2 | 50.5 |
| 10 | 85% | 15% | 0.39 | 7.9 | 87.0 | 6.1 | 50.0 |

Table V shows that particularly remarkable results were obtained after heating at 800° C., with a $C_4A_3\bar{S}$ concentration of 10%.

EXAMPLES 11 AND 12

These examples related respectively to the preparation of double clinker cement by simultaneously grinding the clinkers (Example 12) and by mixing the previously ground clinkers (Example 11).

The appended Table VI lists the results obtained which show that simultaneous grinding or separate grinding followed by mixing give equivalent results.

Generally speaking, the mechanical performances after heating of the concretes prepared from double clinker in accordance with the invention were considerably improved when the admixed $C_4A_3\bar{S}$ clinker was sintered at an elevated temperature, preferably at 1500° C.

TABLE VI

| | | | Chamotte concrete 42–44% Al$_2$O$_3$ 500 kg/m$^2$ | | | | | |
|---|---|---|---|---|---|---|---|---|
| | | | 20° C. | | After heating to | | | |
| | | | 24 h MPa | | 800° C. MPa | | 1100° C. MPa | |
| EXAMPLES | | | W/C | F | C | F | C | F | C |
| | MIXTURE: | | | | | | | | |
| 11 | Fondu 80%(3000 SSB) $C_4A_3\bar{S}$ 20%(7000 SSB) | | 0.37 | 12.3 | 80.0 | 6.9 | 62.0 | 4.4 | 28.5 |
| | SIMULTANEOUS AND JOINT GRINDING: | | | | | | | | |
| 12 | Fondu 80% $C_4A_3\bar{S}$ 20% | | 0.38 | 12.5 | 80.5 | 5.5 | 58.0 | 4.3 | 28.5 |

The invention is not limited to the embodiments described herein-above; many variants and modifications may be envisaged by those skilled in the art within the scope of the invention as defined by the following claims.

What is claimed is:

1. A comminuted double clinker refractory cement comprising 10 to 30 parts by weight of a first clinker having the formula (CaO)$_4$(Al$_2$O$_3$)$_3$(SO$_3$) and 70 to 90 parts by weight of a second clinker containing 30 to 75% of (CaO) (Al$_2$O$_3$).

2. A cement according to claim 1, wherein said (CaO)$_4$(Al$_2$O$_3$)$_3$(SO$_3$) clinker is a clinker obtained by mixing raw materials sufficient to provide CaO, Al$_2$O$_3$ and SO$_3$, in such amounts that after sintering at a temperature higher than 1400° C. a product having the following composition is obtained:

| | | |
|---|---|---|
| . CaO | = | 35–37% |
| . Al$_2$O$_3$ | = | 48–54% |
| . SO$_3$ | = | 9–14% |
| . Fe$_2$O$_3$ | = | 0–4% |
| . SiO$_2$ | = | 0–2%. |

3. The cement of claim 1, wherein said (CaO)$_4$(Al$_2$O$_3$)$_3$(SO$_3$) clinker has a granulometric particle size corresponding to a specific surface of 5000 to 8000 cm$^2$/g.

4. The cement of claim 1, wherein said double clinker cement is prepared by mixing previously ground constituents, the fineness of said cement corresponding to 3000–6000 cm²/g.

5. The cement of claim 1, wherein said double clinker cement is prepared by simultaneously and jointly grinding said clinkers to a fineness of 3500–5000 cm²/g.

6. The cement of claim 1, wherein said first clinker and said second clinker are mixed in a ratio of 20/80.

7. The cement of claim 1, wherein said first clinker is admixed with a second clinker containing 70% by weight $(CaO)(Al_2O_3)$, the ratio of the respective amount by weight of $(CaO)_4(Al_2O_3)_3(SO_3)$ and said second clinker being 10/90.

* * * * *